Sept. 5, 1967   J. H. KAUFFMAN   3,339,899
SYSTEM FOR MULLING AND MIXING FOUNDRY SAND
Filed July 30, 1963   4 Sheets-Sheet 1

INVENTOR.
JOHN H. KAUFFMAN
BY Mason, Kolehmainen
Rathburn + Wyss
atty's:

Sept. 5, 1967  J. H. KAUFFMAN  3,339,899
SYSTEM FOR MULLING AND MIXING FOUNDRY SAND
Filed July 30, 1963  4 Sheets-Sheet 2

Fig-3-

INVENTOR.
JOHN H. KAUFFMAN
BY
Mason, Kolehmainen
Rathburn + Wyss
atty's:

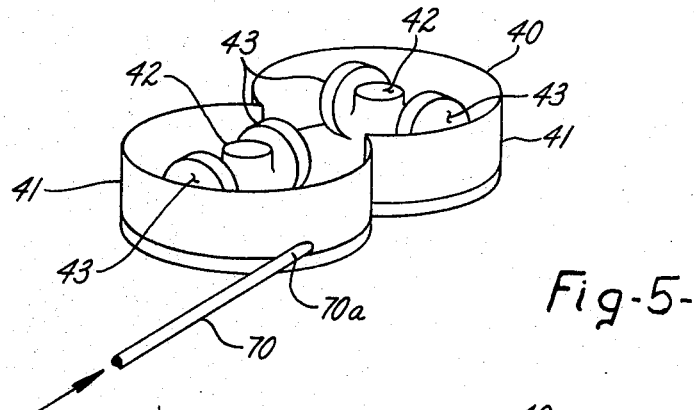
Fig-5-
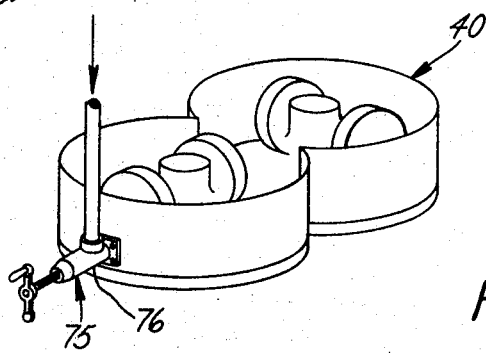
Fig-6-
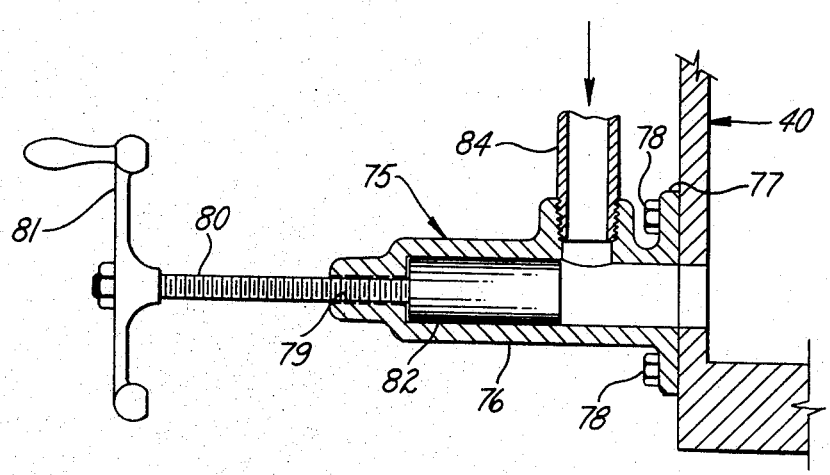
Fig-7-
INVENTOR.
JOHN H. KAUFFMAN
BY
Mason, Kolehmainen
Rathburn + Wyss
atty's.

United States Patent Office 3,339,899
Patented Sept. 5, 1967

3,339,899
SYSTEM FOR MULLING AND MIXING FOUNDRY SAND
John H. Kauffman, Crystal Lake, Ill., assignor, by mesne assignments, to National Engineering Company, Chicago, Ill., a corporation of Delaware
Filed July 30, 1963, Ser. No. 298,728
7 Claims. (Cl. 259—151)

This invention relates to improvements in mixing systems and, more particularly, it has to do with an improved system for mulling and mixing granular material particularly useful in foundries for processing foundry sand and the like.

In the processing of foundry sand and other granular material, the sand is mulled and mixed to condition it for foundry purposes. This is particularly true when reprocessing sand which has already been used in the foundry process. Additionally, in order adequately to condition the sand to provide a mass which can be formed in a pattern and which will retain its shape, it is necessary to combine additives such as binders with the sand.

Accordingly, it is an object of the present invention to provide a new and improved system for introducing granular additives into a mixer for granular materials.

It is a further object of the present invention to provide a new and improved system for introducing granular additives such as bonding and like materials into a mixer for foundry sand and like materials.

It is a further object of the present invention to provide an improved system for introducing granular additives into a mixer wherein the additives are introduced beneath the surface of the granular material in the mixer.

A further object of the present invention is to provide a system for introducing granular additives into a mixer for granular material wherein loss of the additive in the form of dust and the like is minimized.

A further object of the present invention is to provide a new and improved system for introducing additives into a mixer wherein the additives are rapidly dispersed within the material in the mixer.

It is a further object of the present invention to provide a new and improved system for periodically introducing granular additives into a mixer for granular materials in accurately metered quantities.

It is a further object of the present invention to provide a new and improved system for introducing granular additives into a mixer for granular materials in synchronized relation with the rotation of the mixer in accurately metered quantities.

Further objects and advantages of the present invention will become apparent as the following description proceeds and the features of novelty which characterize the invention will be pointed out with particularity in the claims annexed to and forming a part of this specification.

In accordance with these and other objects there is provided an improved system for introducing granular additives, such as bonding and like materials, into a mixer for granular foundry sand and like granular materials. The mixer may be of a known type and, more specifically, may comprise the mixing apparatus disclosed and claimed in the Horth Patent No. 2,727,696 or in the McIlvaine et al. Patent No. 2,943,801. The mixing apparatus disclosed in the above patents includes one or more cribs adapted to be filled with granular material to above a predetermined level, and plows and mullers are provided within the crib for mulling, agitating, and mixing the granular material within the crib. In accordance with the present invention, granular additives such as bondings, which may include bentonite, seacoal, cereal, and the like, are periodically introduced pneumatically by compressed air below the level of the granular material within the mixer in accurately metered quantities. More specifically, the granular additives may be introduced through a pneumatic conduit by a feeding apparatus which may be of the type disclosed and claimed in my copending application Ser. No. 226,239, filed Sept. 26, 1962, now Patent No. 3,197,810 and assigned to the same assignee as the present application. In one embodiment of the invention, the granular additives are introduced into the mixer in adjustable selected timed and metered quantities. In another embodiment of the present invention, the granular additives are introduced in synchronized relation to the plows within the crib. Moreover, in yet another embodiment the granular additives are introduced into the mixer at a variety of locations along the crib. In yet a further embodiment, the granular materials are introduced tangentially through the wall of the circular cribs. In yet a further embodiment, means are provided in the discharge nozzle of the conduit for cleaning out any hardened bonding or other material which may form within the discharge nozzle.

Advantageously, the quantity and period of introduction of bonding material within a mixer of foundry sand is accurately controlled so that the composition of the ultimate mix is controlled. Moreover, by introduction of the bonding material below the surface of the material in the mixer, loss of the bonder through "dusting" of the bonder material into the air is minimized. The sand above the bonder discharge functions as a filter to prevent escape of the bonding material into the surrounding ambient. Also, the present system provides for rapid dispersion of the bonding material with the material in the mixer, particularly where the bond is admitted simultaneously at a number of points around the periphery of the mixer. Moreover, the present system provides a simple and inexpensive means for accurately controlling the introduction of the bonding material. Where the introduction of the bonding material is synchronized with the mixer rotations, the bonding material may be admitted at the most advantageous time.

For a better understanding of the present invention, reference may be had to the accompanying drawings, wherein:

FIG. 5 is a schematic illustration of yet another embodiment of the present invention;

FIG. 6 is a somewhat schematic illustration of a material discharge nozzle according to another embodiment of the present invention; and FIG. 7 is a cross-sectional view of the discharge nozzle of FIG. 6.

Figure 1:
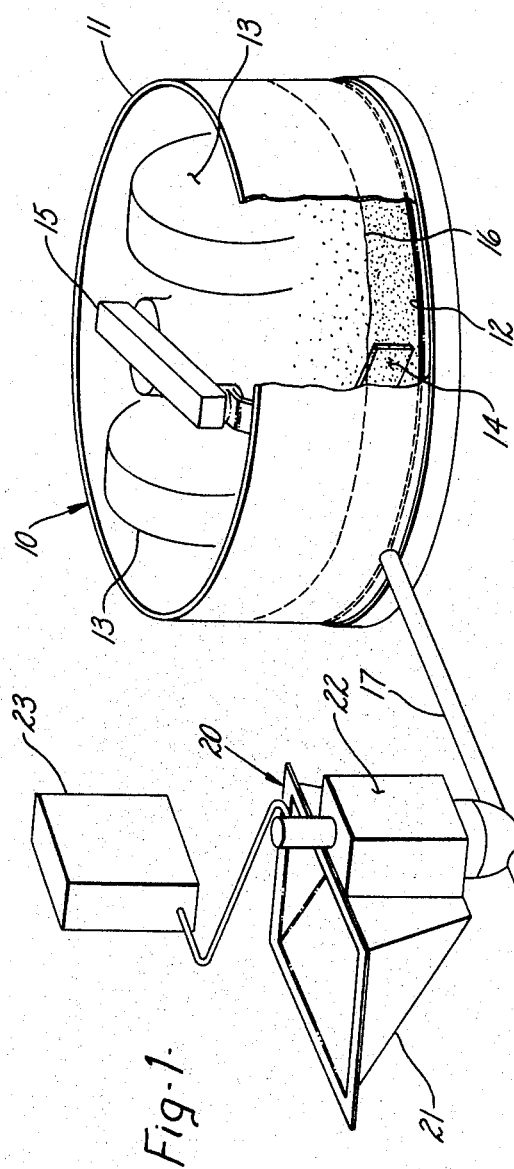
FIG. 1 is a somewhat schematic illustration of a mixing system according to the present invention.

Referring now to the embodiment of FIG. 1, there is illustrated a mixing system according to the present invention and including a mixing and mulling machine generally illustrated at 10. As illustrated, the mixing and mulling machine 10 is similar to that described and claimed in the above-mentioned Horth patent, and, accordingly, will not herein be described in detail. However, briefly, the mixing and mulling machine 10 includes a cylindrical crib 11, closed at the bottom by a wear plate 12; and a plurality of mulling wheels 13 and a plurality of plows 14 extend from ends of a crossarm 15 mounted for rotation within the crib 11. The mulling wheels 12 and plows 14 are effective to break up and mix material within the crib. The crib is adapted to be partially filled with granulated material, such as foundry sand 16, to above a minimum predetermined level as indicated in the drawings.

In order to provide for the injection of additive materials to the sand 16 within the crib 11, there is provided a transport conduit 17 extending through the cylindrical side wall of the crib 11 at a point below the minimum level of sand within the crib. The conduit 17 is also connected to a source of pressurized air, here illustrated as an electrically operated air compressor 18. In one specifically constructed embodiment of the mixing system according to the present invention the transport conduit was a 2-inch conduit and the air compressor 18 provided 100 cu. ft./min. of air at a pressure of 6 p.s.i.g.

To provide for the periodic introduction of a metered quantity of granular additive material into the air stream flowing through the conduit 17, there is provided the additive feeding system, generally illustrated at 20, and which in the illustrated embodiment is similar to that described in my above-mentioned copending application. Accordingly, the feeding system 20 need not be described herein in detail. However, the feeding system 20 includes a hopper 21 communicating with a flow valve 22 opening into the conduit 17. The flow valve 22 is arranged to discharge an adjustably selectable metered quantity of material into the conduit 17 each time it is actuated. In the embodiment of FIG. 1, the flow valve 22 is actuated periodically in adjustably selected timed relation by a pneumatic control system 23 so that at the selected time intervals the flow valve 22 will be actuated to inject a predetermined metered quantity of additive material into the transport conduit 17. It will be appreciated that in the illustrated embodiment there is a constant flow of air under pressure through the conduit 17 so that any discharge of granular material into the conduit 17 will be injected into the mixer below the level of the sand in the mixer. The constant flow of air through the conduit 17 advantageously keeps the conduit 17 open and prevents blocking or hardening of the material at the discharge end of the conduit.

In a particular commercial embodiment of the present invention, the feeding system 20 was adjusted to discharge one-half pound of additive material into the conduit 17 every seventeen seconds. Of course, it is understood that the quantity and time interval may be varied to suit the particular requirement of the mixing system.

Figure 2:
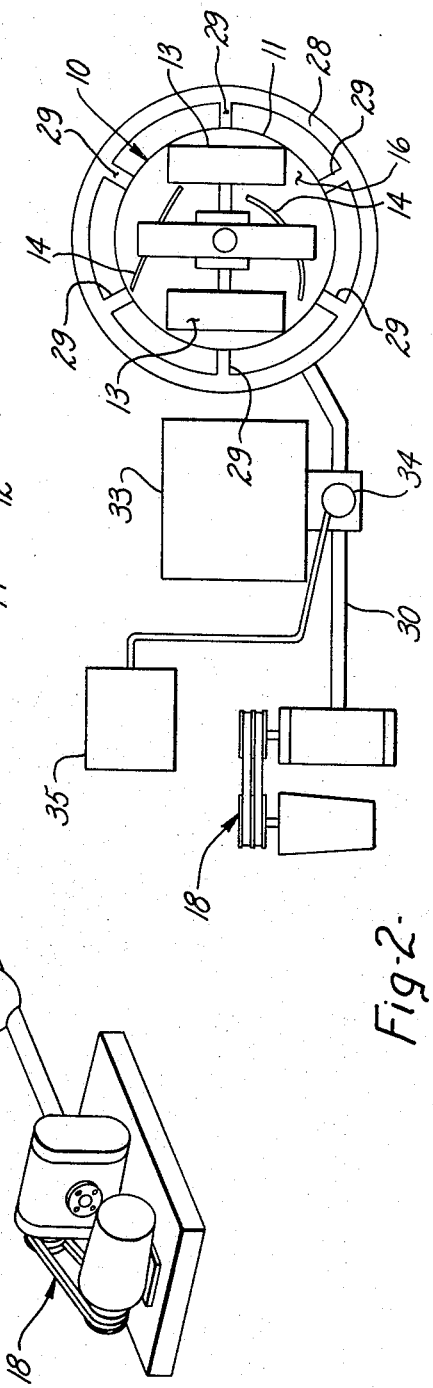
FIG. 2 is a somewhat schematic illustration of a mixing system according to another embodiment of the present invention.

Referring now to the maxing system illustrated in the embodiment of FIG. 2, the mixing system includes a mixing and mulling machine 10 identical to the mixing and mulling machine described in FIG. 1 and including a cylindrical crib 11 closed at the bottom by a wear plate (not shown) over which passes a plurality of mulling wheels 13 and a plurality of plows 14. The crib 11 of the mixing and mulling machine 10 is adapted to be partially filled with sand requiring treatment for processing within the mixing and mulling machine 10.

In accordance with the embodiment of FIG. 2, the additive material is directed into the crib 11 at a plurality of circumferentially located points; more specifically, there is provided an air manifold 28 having a plurality of discharge nozzles 29 circumferentially spaced around the crib 11 and each discharging into the crib 11 at a point below the minimum level of sand within the mixing and mulling machine. The manifold 28 is connected to a source of air under pressure, here illustrated as an air compressor 18, by a transport conduit 30.

For providing the additive material to the transport conduit 30, there is provided a feeding system similar to that described in connection with the embodiment of FIG. 1 above and more fully described in my abovementioned copending application. This feeding system 32, as illustrated in FIG. 2, includes an additive hopper 33 discharging into a flow valve 34 arranged to periodically discharge a preselected quantity of additive material in predetermined time intervals through an electric time control mechanism schematically represented at 35. It will be appreciated that because of the introduction of the additive material at spaced points around the periphery of the crib 11 there is provided a very rapid and homogeneous distribution of the additive material to the mixing and mulling machine 10.

Figure 3:
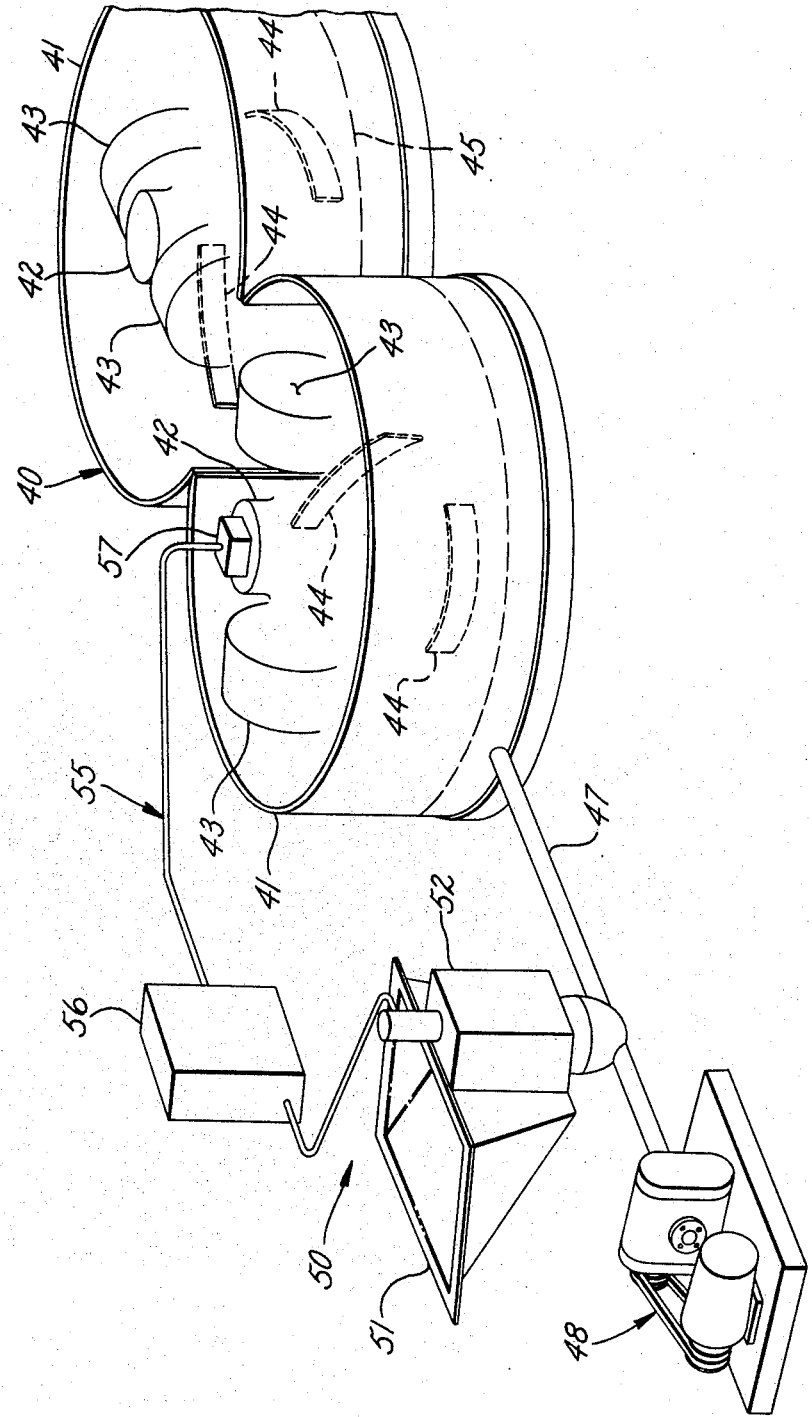
FIG. 3 is a somewhat schematic illustration of yet another embodiment of a mixing system according to the present invention.
Figure 4:
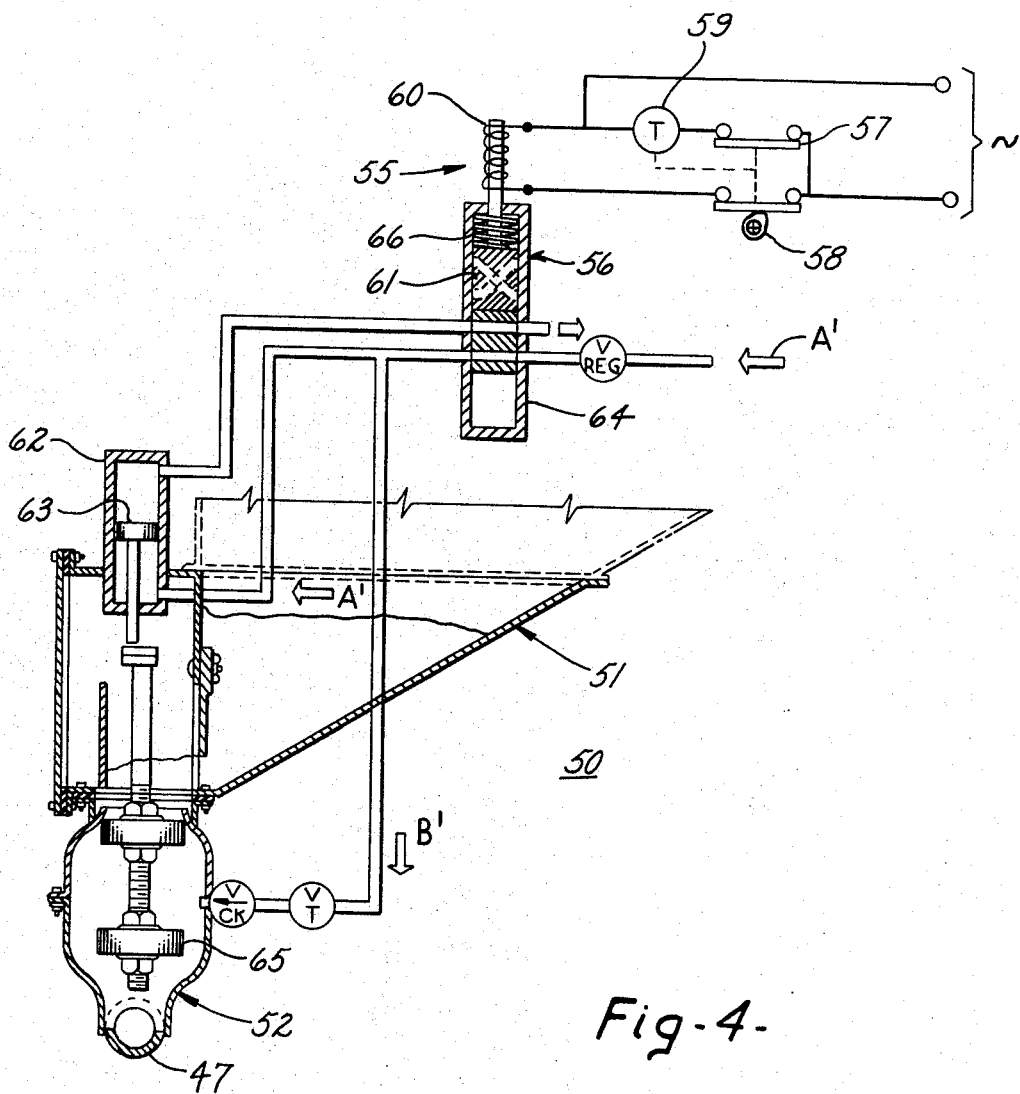
FIG. 4 is a partially schematic illustration of the control system of FIG. 3.

Under certain conditions it may be advantageous to synchronize the injection of the additive material with the position of the rotor in the mixing and mulling machine. One such embodiment is illustrated in FIGS. 3 and 4. As therein illustrated, the improved mixing and transporting system includes a mixing and mulling machine 40 similar in operation to that heretofore described, but of the multicrib type as disclosed and claimed in the aforementioned McIlvaine et al. patent. Briefly, the mixing and mulling machine 40 includes a pair of generally cylindrical communicating cribs 41, each provided with a rotatable crossarm 42 carrying a pair of mulling wheels 43 and a pair of plows 44. The mixing and mulling machine 40 operates on the principle that at least some of the material in each of the cribs 41 moves back and forth between the respective cribs. Moreover, as more fully described in the aforementioned McIlvaine et al. patent, the mulling and mixing machine 40 is readily adaptable to either batch or continuous operation. The cribs 41 are adapted to be partially filled with sand 45 to at least a predetermined minimum level.

To provide for the transfer and addition of granular additive to the mixing and mulling machine 40, there is provided a transport conduit 47 having one end discharging radially into the side wall of one of the cribs 41 and having its other end adapted for connection to a source of air under pressure, here shown as an air compressor 48. The air compressor 48 is adapted to provide a continuous flow of air to the transport conduit 47.

For supplying the desired additives to the transport conduit 47 in synchronized relation to the position of the crossarm in the cribs 41 there is provided the feeding system generally illustrated as 50. The feeding system includes a hopper 51 for additive material and a flow valve 52 for controlling the discharge of the granular material into the conduit 47. The hopper 51 and the flow valve 52 is similar to that described in my aforementioned copending application.

For synchronizing the injection of granular additive materials into the conduit 47 in relation to the position of the crossarm 42 in the crib 41, there is provided a control system 55 schematically illustrated in FIG. 3 and more fully shown in FIG. 4. The control system 55 includes an electro-pneumatic control valve 56 and an electrical position sensing switch 57 operated from a cam or projection 58 on the crossarm 42 in one of the cribs 41. More specifically, the switch 57 is a double-pole switch movable to an ON position to actuation of the cam 58 and automatically returned to an OFF position by a timer 59 mechanically connected to the switch 57. Closure of the switch is effective to energize an electromagnetic winding 60 thereby to move a valve element 61 in a control valve 64 into one of its positions whereby pneumatic air under pressure is directed to the lower end of a pneumatic cylinder 62, as identified by the arrow A'. The pneumatic pressure acting on the lower surface of a piston 63 within the cylinder 62 is effective to move a valve element 65 in the flow valve 52 to an open position and air under pressure, as identified by the arrow B', is directed into the body of the flow valve 52 to forcibly reject or discharge granular material accumulated within the flow valve 52 and into the transport conduit 47. It will be appreciated that the duration that the valve element 65 is maintained open will determine the amount of granular additive material which is ejected from the chamber of the flow valve 52 into the conduit 47. In order to selectively adjust such duration, the timer 59 is conducted in the power line to be energized when the switch 57 is closed and is mechanically connected to open the switch at the expiration of the preselected time interval. Once the switch 57 is opened by the action of the timer 59, the winding 60 is deenergized and a compression spring 66 within the control valve 56 is effective to move the valve element 61 to a second position wherein the direction of the pneumatic pressure in the pneumatic cylinder is reversed so that the pressure is applied to the top of the piston 63. This drives the piston 63 downwardly which, in turn, drives the valve element 65 downwardly to close the flow valve 52.

The cam 58 may be synchronized relative to the mixing and mulling machine 40 into any desired position, and, specifically, it may be preferable to inject the granular additive just after the plows have passed the discharge opening of the conduit 57.

Referring now to the embodiment of FIG. 5, there is illustrated a multicrib mixing and mulling machine 40 which, as heretofore described, includes a pair of communicating generally cylindrical cribs 41, each having a rotatably mounted crossarm 42 carrying a pair of mulling wheels 43 and a pair of mixing plows (not shown). In the embodiment of FIG. 5, there is provided a transport conduit 70, adapted to carry a flow of air under pressure and to receive periodic injections of granular additive materials in one of the manners heretofore described. The discharge end 70a of the transport conduit 70 passes through the cylindrical side wall of one of the cribs 41 substantially tangentially, and below the minimum level of granular material within the mixing and mulling machine 40.

FIGS. 6 and 7 illustrate a hand cleanable injection nozzle which is effective to break loose any hardened material which may form in the discharge end of the transport conduit. More specifically, as therein illustrated, there is shown an injection nozzle 75 connected to the lower cylindrical side wall of a crib of a mixing and mulling machine 40. The injection nozzle 75 includes a generally T-shaped valve body 76 having a flange 77 (FIG. 7) at one end of the cross member adapted to be secured to the side wall of the mixing and mulling machine 40 by bolts 78 or other suitable attaching means. The other end of the cross member of the valve body 76 is provided with a reduced diameter thread 79 through which passes a hand screw 80. A hand crank 81 is secured to the outer end of the screw 80 and a piston 82 is secured to the inner end of the hand screw 80. Moreover, the center opening of the flange body 78 is adapted to receive a transport conduit 84 through which is received air under pressure with periodic injections of suitable additive materials.

In operation, the injection nozzle 75 is opened when the hand crank 81 is turned so that the hand screw 80 projects substantially out of the valve body 76, the piston 82 clearing the opening of the conduit 84. However, in order to clean or remove any hardened material from the discharge end of the injection nozzle 75, the hand crank 81 may be manually turned to thread the hand screw 80 into the valve body 76 and to cause the piston 82 to move through the injection opening of the nozzle thereby to force any hardened material out of the valve body.

It will be seen from the numerous modifications and embodiments described above that numerous other modifications and embodiments may be devised by those skilled in the art and it is intended in the appended claims to cover all modifications and embodiments which will fall within the true spirit and scope of the present invention.

What is claimed as new and desired to be secured by Letters Patent of the United States is:

1. A system for introducing additives such as bonding and like materials into a mass of particulate material such as foundry sand and the like comprising a mixer includng crib means adapted to contain said mass of particulate material having a predetermined upper level, rotor means within said crib means for agitating and mixing said mass of material around said crib means; a conduit having one end in communication with a source of compressed fluid and the other end in communication with said crib means below said predetermined level; and feeder means for periodically introducing metered quantities of additives into said conduit to be carried by said fluid into said mass of particulate material in said crib means.

2. A system as set forth in claim 1 wherein the last-mentioned means includes means for varying the quantity of additives introduced into the conduit during each periodic introduction.

3. A system as set forth in claim 1 wherein the last-mentioned means includes automatically timed control means for adjustably selecting the interval of the periods between the introduction of the additives.

4. A system as set forth in claim 1 wherein the last-mentioned means includes means synchronized with the position of the rotor means to provide for the introduction of the additive, and additionally including means for adjustably selecting the quantity of additives introduced during each period of introduction.

5. A system as set forth in claim 1 above wherein said other end of said conduit includes a manifold and a plurality of discharge nozzles each having an outlet in communication with said crib means below said predetermined level so that said additives are substantially simultaneously introduced into said crib means from a plurality of points spaced around the periphery thereof.

6. A system as set forth in claim 1 above wherein said crib means includes a curved outer wall portion and said conduit is disposed with its other end tangentially intersecting said wall portion.

7. A system as set forth in claim 1 above and additionally including an injection nozzle on said other end of said conduit which opens into said crib, said nozzle including means for cleaning out any accumulation of hardened material in the discharge opening of said nozzle.

References Cited

UNITED STATES PATENTS

| | | | |
|---|---|---|---|
| 1,920,463 | 8/1933 | Edwards | 259—151 X |
| 2,217,118 | 10/1940 | Jesson et al. | 241—57 |
| 2,309,036 | 1/1943 | Beardsley | 22—89 X |
| 2,477,948 | 8/1949 | Allen | 22—89 X |
| 2,593,327 | 4/1952 | McIlvaine | 22—89 |
| 2,902,681 | 9/1959 | Dietert et al. | 22—89 X |
| 3,109,210 | 11/1963 | Jameson | 22—89 |

FOREIGN PATENTS

| | | |
|---|---|---|
| 554,518 | 7/1932 | Germany. |

J. SPENCER OVERHOLSER, *Primary Examiner.*